(12) United States Patent
Bowen

(10) Patent No.: US 7,294,083 B2
(45) Date of Patent: Nov. 13, 2007

(54) TORQUE VECTORING AXLE ASSEMBLY

(75) Inventor: Thomas C. Bowen, Rochester Hills, MI (US)

(73) Assignee: Magna Powertrain, USA, Inc., Troy, MI (US)

( * ) Notice: Subject to any disclaimer, the term of this patent is extended or adjusted under 35 U.S.C. 154(b) by 0 days.

(21) Appl. No.: 11/634,475

(22) Filed: Dec. 6, 2006

(65) Prior Publication Data

US 2007/0066436 A1    Mar. 22, 2007

Related U.S. Application Data

(63) Continuation of application No. 11/287,713, filed on Nov. 28, 2005, now Pat. No. 7,175,559.

(60) Provisional application No. 60/647,239, filed on Jan. 26, 2005.

(51) Int. Cl.
*F16H 48/06* (2006.01)
*B60K 17/344* (2006.01)

(52) U.S. Cl. ...................................... 475/225; 180/248

(58) Field of Classification Search ................ 475/200, 475/201, 203, 204, 205, 207, 225, 303, 343; 180/248
See application file for complete search history.

(56) References Cited

U.S. PATENT DOCUMENTS

| | | | |
|---|---|---|---|
| 856,703 A | 6/1907 | Iversen | |
| 1,382,289 A | 6/1921 | Janicki | |
| 1,954,686 A | 4/1934 | Stickney | |
| 1,964,956 A | 7/1934 | Lincoln | |
| 2,103,143 A | * 12/1937 | Brown | 475/225 |
| 2,466,683 A | 4/1949 | Buckendale | |
| 2,874,790 A | * 2/1959 | Hennessey | 180/6.2 |
| 3,690,426 A | 9/1972 | Weisgerber | |
| 4,691,593 A | 9/1987 | Mueller | |
| 4,722,243 A | * 2/1988 | Giere | 475/225 |
| 4,757,728 A | 7/1988 | Pitsch | |
| 4,763,747 A | 8/1988 | Muller | |
| 4,805,721 A | * 2/1989 | Takahashi et al. | 180/248 |
| 4,973,296 A | * 11/1990 | Shibahata | 475/231 |
| 5,370,588 A | 12/1994 | Sawase et al. | |
| 5,415,598 A | 5/1995 | Sawase et al. | |
| 5,456,641 A | 10/1995 | Sawase | |
| 5,632,185 A | 5/1997 | Gassmann | |

(Continued)

FOREIGN PATENT DOCUMENTS

WO    WO 02/09966 A1    2/2002

*Primary Examiner*—Roger Pang
(74) *Attorney, Agent, or Firm*—Harness, Dickey & Pierce, P.L.C.

(57) ABSTRACT

A drive axle assembly includes first and second axleshafts connected to a pair of wheels and a drive mechanism operable to selectively couple a driven input shaft to one or both of the axleshafts. The drive mechanism includes a differential, a speed changing unit operably disposed between the differential assembly and one of the first and second axleshafts, and first and second mode clutches. The first mode clutch is operable to engage the speed changing unit for reducing the rotary speed of the second axleshaft relative to the rotary speed of the first axleshaft. The second mode clutch is operable to engage the speed changing unit for increasing the rotary speed of the second axleshaft relative to the rotary speed of the first axleshaft. A control system controls actuation of both mode clutches.

19 Claims, 9 Drawing Sheets

U.S. PATENT DOCUMENTS

| | | |
|---|---|---|
| 5,699,888 A | 12/1997 | Showalter |
| 5,904,634 A | 5/1999 | Teraoka |
| 5,910,064 A | 6/1999 | Kuroki |
| 5,911,291 A | 6/1999 | Suetake et al. |
| 6,120,407 A | 9/2000 | Mimura |
| 6,213,241 B1 | 4/2001 | Kita et al. |
| 6,378,677 B1 | 4/2002 | Kuroda et al. |
| 6,394,246 B1 | 5/2002 | Gassmann et al. |
| 6,520,880 B1 | 2/2003 | Fukushima et al. |
| 6,533,090 B2 | 3/2003 | Osborn et al. |
| 6,616,566 B2 | 9/2003 | Gorlich |
| 6,645,108 B1 | 11/2003 | Gradu |
| 6,951,522 B2 | 10/2005 | Baxter et al. |
| 7,175,559 B2 * | 2/2007 | Bowen ................ 475/225 |

* cited by examiner

TORQUE VECTORING AXLE ASSEMBLY

CROSS-REFERENCE TO RELATED APPLICATIONS

This application is a continuation of U.S. patent application Ser. No. 11/287,713 filed on Nov. 28, 2005, now U.S. Pat. No. 7,175,559 which claims the benefit of U.S. Provisional Application No. 60/647,239, filed on Jan. 26, 2005. The disclosure of the above applications are incorporated herein by reference.

FIELD OF THE INVENTION

The present invention relates generally to differential assemblies for use in motor vehicles and, more specifically, to a differential assembly equipped with a torque vectoring drive mechanism and an active control system.

BACKGROUND OF THE INVENTION

In view of consumer demand for four-wheel drive vehicles, many different power transfer system are currently utilized for directing motive power ("drive torque") to all four-wheels of the vehicle. A number of current generation four-wheel drive vehicles may be characterized as including an "adaptive" power transfer system that is operable for automatically directing power to the secondary driveline, without any input from the vehicle operator, when traction is lost at the primary driveline. Typically, such adaptive torque control results from variable engagement of an electrically or hydraulically operated transfer clutch based on the operating conditions and specific vehicle dynamics detected by sensors associated with an electronic traction control system. In conventional rear-wheel drive (RWD) vehicles, the transfer clutch is typically installed in a transfer case for automatically transferring drive torque to the front driveline in response to slip in the rear driveline. Similarly, the transfer clutch can be installed in a power transfer device, such as a power take-off unit (PTU) or in-line torque coupling, when used in a front-wheel drive (FWD) vehicle for transferring drive torque to the rear driveline in response to slip in the front driveline. Such adaptively-controlled power transfer system can also be arranged to limit slip and bias the torque distribution between the front and rear drivelines by controlling variable engagement of a transfer clutch that is operably associated with a center differential installed in the transfer case or PTU.

To further enhance the traction and stability characteristics of four-wheel drive vehicles, it is also known to equip such vehicles with brake-based electronic stability control systems and/or traction distributing axle assemblies. Typically, such axle assemblies include a drive mechanism that is operable for adaptively regulating the side-to-side (i.e., left-right) torque and speed characteristics between a pair of drive wheels. In some instances, a pair of modulatable clutches are used to provide this side-to-side control, as is disclosed in U.S. Pat. Nos. 6,378,677 and 5,699,888. According to an alternative drive axle arrangement, U.S. Pat. No. 6,520,880 discloses a hydraulically-operated traction distribution assembly. In addition, alternative traction distributing drive axle assemblies are disclosed in U.S. Pat. Nos. 5,370,588 and 6,213,241.

As part of the ever increasing sophistication of adaptive power transfer systems, greater attention is currently being given to the yaw control and stability enhancement features that can be provided by such traction distributing drive axles. Accordingly, this invention is intended to address the need to provide design alternatives which improve upon the current technology.

SUMMARY OF THE INVENTION

Accordingly, it is an objective of the present invention to provide a drive axle assembly for use in motor vehicles which is equipped with an adaptive yaw control system.

To achieve this objective, the drive axle assembly of the present invention includes first and second axleshafts connected to a pair of wheels and a torque distributing drive mechanism that is operable for transferring drive torque from a driven input shaft to the first and second axleshafts. The torque distributing drive mechanism includes a differential, a speed changing unit, and first and second mode clutches. The differential includes an input component driven by the input shaft, a first output component driving the first axleshaft and a second output component driving the second axleshaft. The speed changing unit includes a transfer shaft commonly driven with the second axleshaft and first and second gearsets driven by the first axleshaft. The first mode clutch is operable for selectively coupling the first gearset to the transfer shaft. Likewise, the second mode clutch is operable for selectively coupling the second gearset to the transfer shaft. Accordingly, selective control over actuation of one or both of the first and second mode clutches provides adaptive control of the speed differentiation and the torque transferred between the first and second axleshafts. A control system including and ECU and sensors are provided to control actuation of both mode clutches.

According to one preferred embodiment, the first gearset of the speed changing unit is an underdrive unit that is operable to decrease the rotary speed of the second axleshaft relative to the first axleshaft. Likewise, the second gearset of the speed changing unit is an overdrive unit that is operable to increase the rotary speed of the second axleshaft relative to the first axleshaft. As such, engagement of the first mode clutch results in the second axleshaft being underdriven relative to the first axleshaft. In contrast, engagement of the second mode clutch results in the second axleshaft being overdriven relative to the first axleshaft.

Pursuant to an alternative objective of the present invention, the torque distributing drive mechanism can be utilized in a power transfer unit, such as a transfer case, of a four-wheel drive vehicle to adaptively control the front-rear distribution of drive torque delivered from the powertrain to the front and rear wheels.

Further objectives and advantages of the present invention will become apparent by reference to the following detailed description of the preferred embodiments and the appended claims when taken in conjunction with the accompanying drawings.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
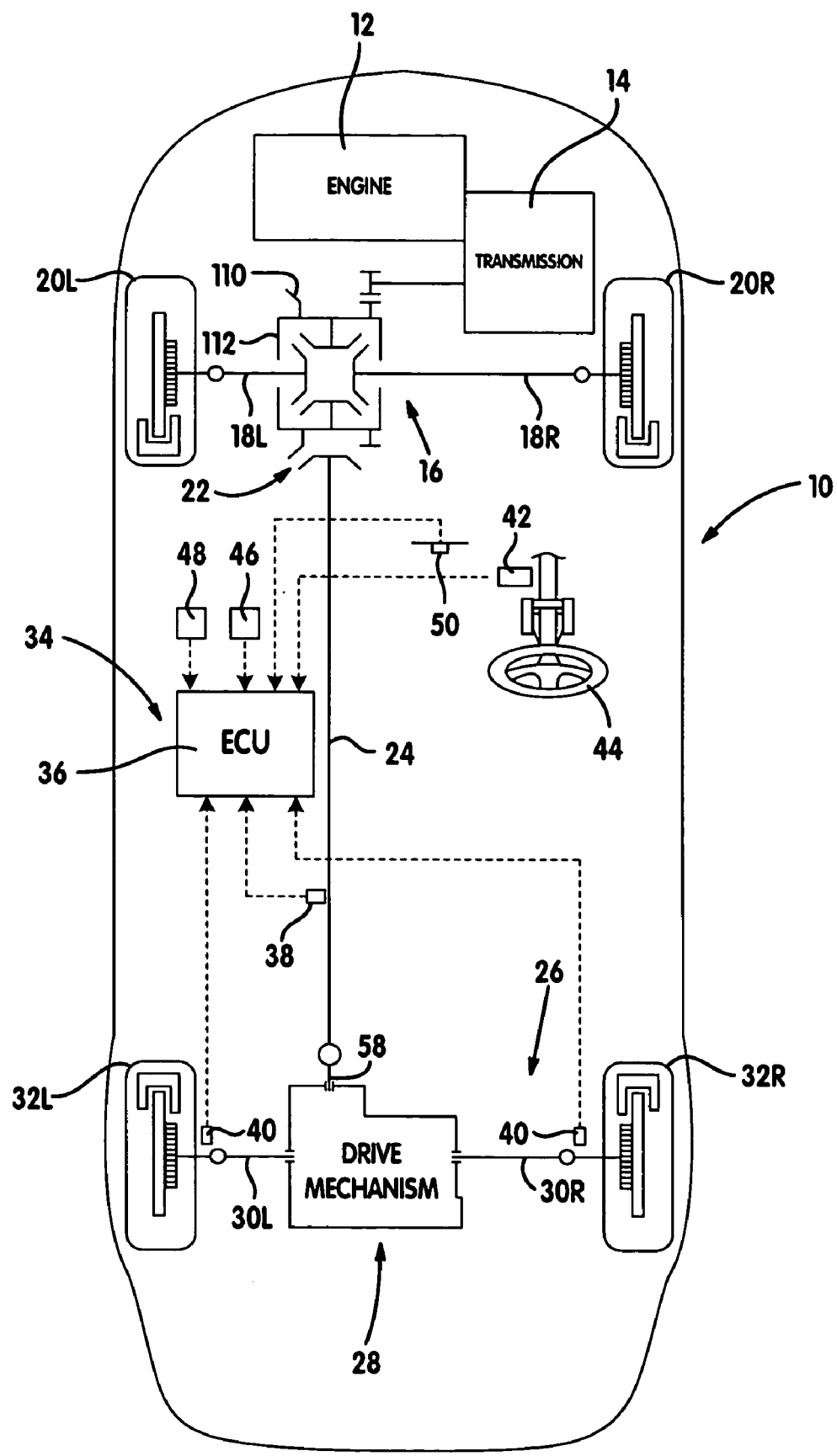
FIG. 1 is a diagrammatical illustration of an all-wheel drive motor vehicle equipped with a drive axle having a torque distributing differential assembly and an active yaw control system according to the present invention.

Referring to FIG. 1, an all-wheel drive vehicle 10 includes an engine 12 transversely mounted in a front portion of a vehicle body, a transmission 14 driven by engine 12 and a front differential 16 which connects the output of transmission 14 to front axleshafts 18L and 18R and left and right front wheels 20L and 20R. Vehicle 10 further includes a power transfer unit ("PTU") 22 which connects front differential 16 to a propshaft 24 and a rear axle assembly 26 having a torque distributing drive mechanism 28 which connects propshaft 24 to axleshafts 30L and 30R for driving left and right rear wheels 32L and 32R. As will be detailed, drive mechanism 28 is operable in association with a yaw control system 34 for controlling the transmission of drive torque through axleshafts 30L and 30R to rear wheels 32L and 32R.

In addition to an electronic control unit (ECU) 36, yaw control system 34 includes a plurality of sensors for detecting various operational and dynamic characteristics of vehicle 10. For example, a front wheel speed sensor 38 is provided for detecting a front wheel speed value based on rotation of propshaft 24, a pair of rear wheel speed sensors 40 are operable to detect the individual rear wheel speed values based rotation of left and right axle shafts 30L and 30R, and a steering angle sensor 42 is provided to detect the steering angle of a steering wheel 44. The sensors also include a yaw rate sensor 46 for detecting a yaw rate of the body portion of vehicle 10, a lateral acceleration sensor 48 for detecting a lateral acceleration of the vehicle body, and a lock switch 50 for permitting the vehicle operator to intentionally shift drive mechanism 28 into a locked mode. As will be detailed, ECU 36 controls operation of a pair of mode clutches associated with drive mechanism 28 by utilizing a control strategy that is based on input signals from the various sensors and lock switch 50.

Figure 2:
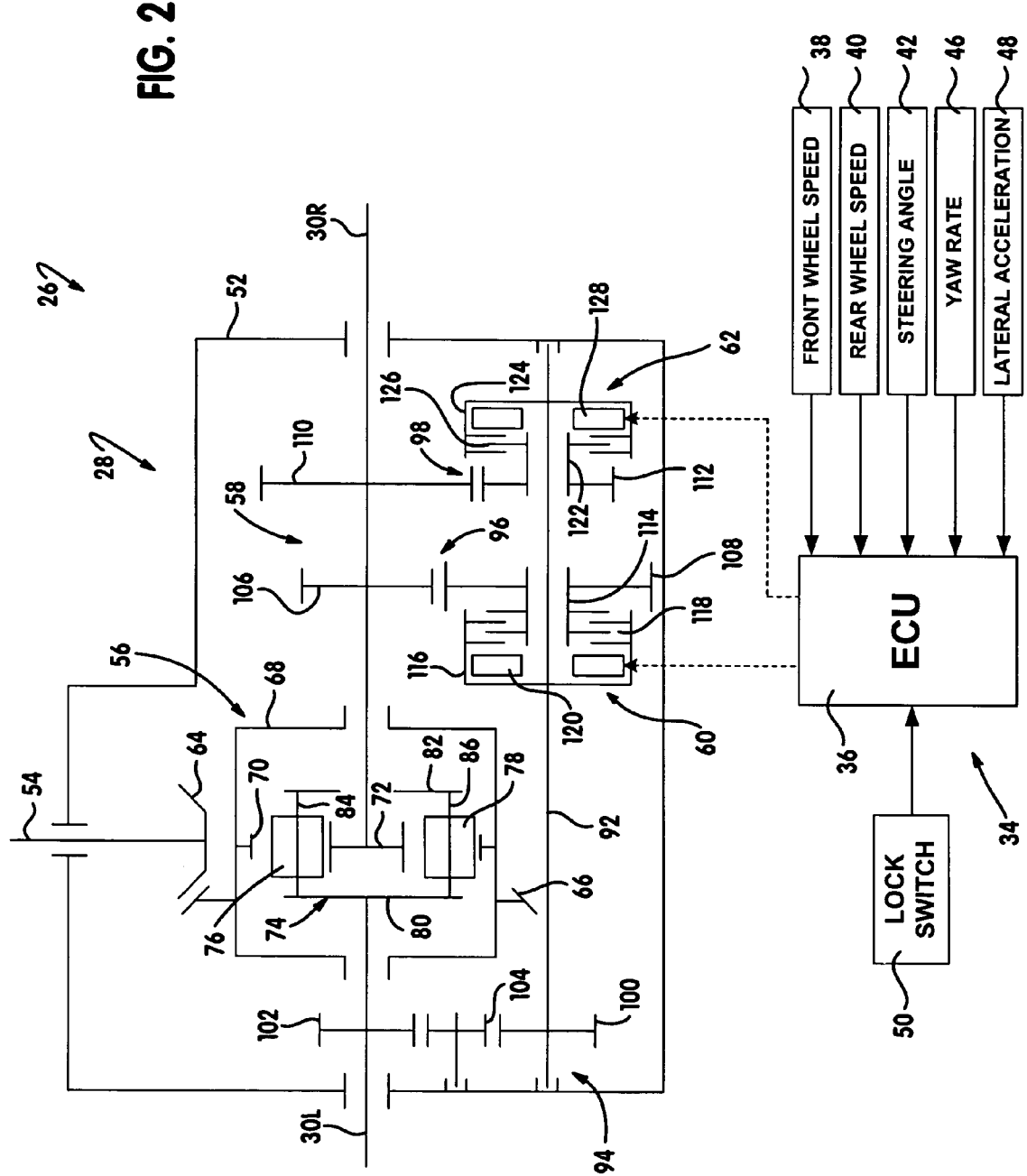
FIG. 2 is a schematic illustration of the torque distributing differential assembly shown in FIG. 1.

Referring now to FIG. 2, rear axle assembly 26 includes an axle housing 52 within which drive mechanism 28 is rotatably supported. In general, torque distributing drive mechanism 28 includes an input shaft 54, a differential 56, a speed changing unit 58, a first mode clutch 60 and a second mode clutch 62. As seen, input shaft 54 includes a pinion gear 64 that is in constant mesh with a hypoid ring gear 66. Ring gear 66 is fixed for rotation with a drive case 68 associated with differential 56. As seen, differential 56 is a planetary gearset having an annulus ring gear 70 fixed for common rotation with drive case 68, a sun gear 72 fixed for rotation with right axleshaft 30R, a differential carrier 74 fixed for rotation with left axleshaft 30L, and meshed pairs of first planet gears 76 and second planet gears 78. First planet gears 76 are shown to be meshed with sun gear 72 while second planet gears 78 are meshed with annulus ring gear 70. Differential carrier 74 is a multi-piece assembly having a first carrier ring 80 interconnected to a second carrier ring 82 with first and second pins 84 and 86, respectively, extending therebetween and on which corresponding first and second planet gears 76 and 78 are rotatably supported. Differential 56 is operable to transfer drive torque from drive case 68 to axleshafts 30L and 30R at a ratio defined by the gear components while permitting speed differentiation therebetween. Preferably, a 50/50 torque split ratio is established by differential 56 for use in this particular drive axle application. Thus, differential 56 has ring gear 70 as its input component, differential carrier 74 as one output component and sun gear 72 as its other output component. However, it should be understood that differential 56 is merely intended to represent one differential arrangement applicable for use with the present invention and that other know planetary and hypoid-type differentials could be substituted for use with the present invention.

Speed changing unit 58 includes a transfer shaft 92 operably connected for rotation with left axleshaft 30L via a transfer unit 94, a first constant-mesh gearset 96 and a second constant-mesh gearset 98. Transfer unit 94 is preferably a direct ratio (i.e., 1:1) unit for driving left axleshaft 30L and a common speed with transfer shaft 92. Transfer unit 94 includes a first transfer gear 100 coupled for rotation with transfer shaft 92, a second transfer gear 102 coupled for rotation with left axleshaft 30L and an idler gear 104 that is meshed with both of first transfer gear 100 and second transfer gear 102. First gearset 96 includes a first drive gear 106 that is fixed to right axleshaft 30R and meshed with a first speed gear 108 that is rotatably supported on transfer shaft 92. In essence, first gearset 96 is a speed reducing or "underdrive" gearset which functions to cause first speed gear 108 to be rotatably driven at a slower rotary speed than rear axleshaft 30R. Likewise, second gearset 98 includes a second drive gear 110 that is fixed to right axleshaft 30R and meshed with a second speed gear 112 that is rotatably supported on transfer shaft 92. In contrast to first gearset 96, second gearset 98 is a speed increasing or "overdrive" gearset which functions to cause second speed gear 112 to be driven at a faster rotary speed than right axleshaft 30R.

With continued reference to FIG. 2, first mode clutch 60 is shown to be operably disposed between first speed gear 108 of first gearset 96 and transfer shaft 92. In particular, first mode clutch 60 includes a clutch hub 114 that is connected to first speed gear 108 and a drum 116 that is fixed for rotation with transfer shaft 92. First mode clutch 60 also includes a multi-plate clutch pack 118 that is operably disposed between drum 116 and hub 114 and a power-operated clutch actuator 120. First mode clutch 60 is operable in a first or "released" mode so as to permit unrestricted rotation of transfer shaft 92 relative to right axleshaft 30R. In contrast, first mode clutch 60 is also operable in a second or "locked" mode to couple first speed gear 108 to transfer shaft 92, thereby causing transfer shaft 92 to drive left axleshaft 30L at a reduced speed relative to right axleshaft 30R. Thus, first mode clutch 60 functions in its locked mode to decrease the rotary speed of left axleshaft 30L relative to the rotary speed of right axleshaft 30R, thereby directing more drive torque to right axleshaft 30R than is transmitted to left axleshaft 30L and generating a leftward yaw movement. First mode clutch 60 is shifted between its released and locked modes via actuation of power-operated clutch actuator 120 in response to control signals from ECU 36. Specifically, first mode clutch 60 is operable in its released mode when clutch actuator 120 applies a predetermined minimum clutch engagement force on clutch pack 118 and is further operable in its locked mode when clutch actuator 120 applies a predetermined maximum clutch engagement force on clutch pack 118.

Second mode clutch 62 is shown to be operably disposed between second speed gear 112 of second gearset 98 and transfer shaft 92. In particular, second mode clutch 62 includes a clutch hub 122 that is fixed for rotation with second speed gear 112, a drum 124 fixed for rotation with transfer shaft 92, a multi-plate clutch pack 126 operably disposed between hub 122 and drum 124, and a power-operated clutch actuator 128. Second mode clutch 62 is operable in a first or "released" mode so as to permit unrestricted relative rotation between right axleshaft 30R and transfer shaft 92. In contrast, second mode clutch 62 is also operable in a second or "locked" mode to couple second speed gear 112 to transfer shaft 92, thereby causing transfer shaft 92 to drive left axleshaft 30L at an increased rotary speed relative to right axleshaft 30R. Thus, second mode clutch 62 functions in its locked mode to increase the rotary speed of left axleshaft 30L which relative to right axleshaft 30R, thereby directing more drive torque to left axleshaft 30L than is directed to right axleshaft 30R and generating a rightward yaw movement. Second mode clutch 62 is shifted between its released and locked modes via actuation of power-operated clutch actuator 128 in response to control signals from ECU 36. In particular, second mode clutch 62 operates in its released mode when clutch actuator 128 applies a predetermined minimum clutch engagement force on clutch pack 126 while it operates in its locked mode when clutch actuator 128 applies a predetermined maximum clutch engagement force on clutch pack 126.

Figure 3:
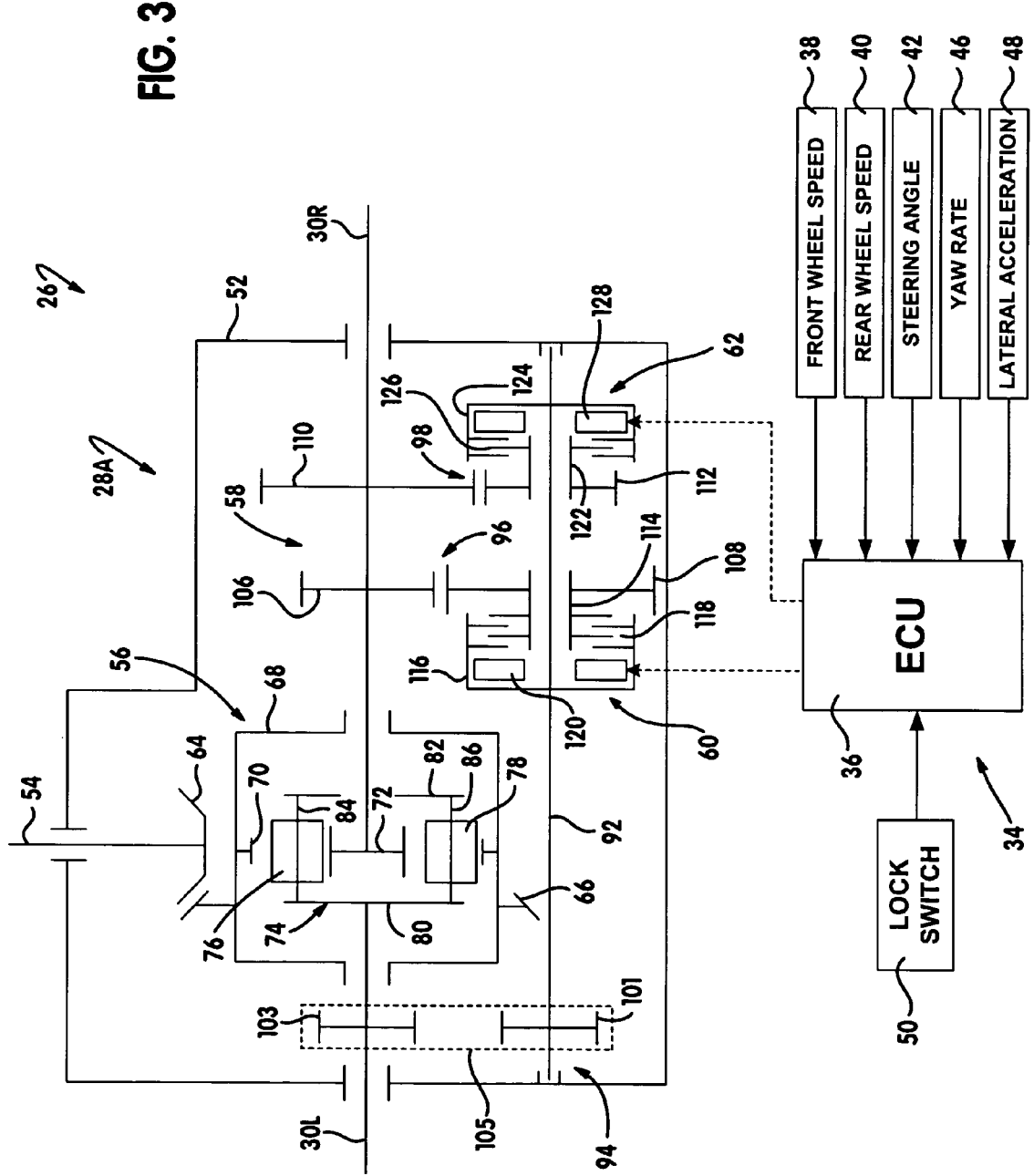
FIG. 3 is a schematic illustration of an alternative version of the torque distributing differential assembly shown in FIG. 2.

FIG. 3 illustrates a modified version of drive mechanism 28, hereinafter identified as drive mechanism 28A and which basically illustrates substitution of geared transfer unit 94 with a chain driven transfer unit 94A. In this regard, transfer unit 94A includes a first sprocket 101 fixed to transfer shaft 92, a second sprocket 103 fixed to left axleshaft 30L and a power chain 105 therebetween.

Figure 4:
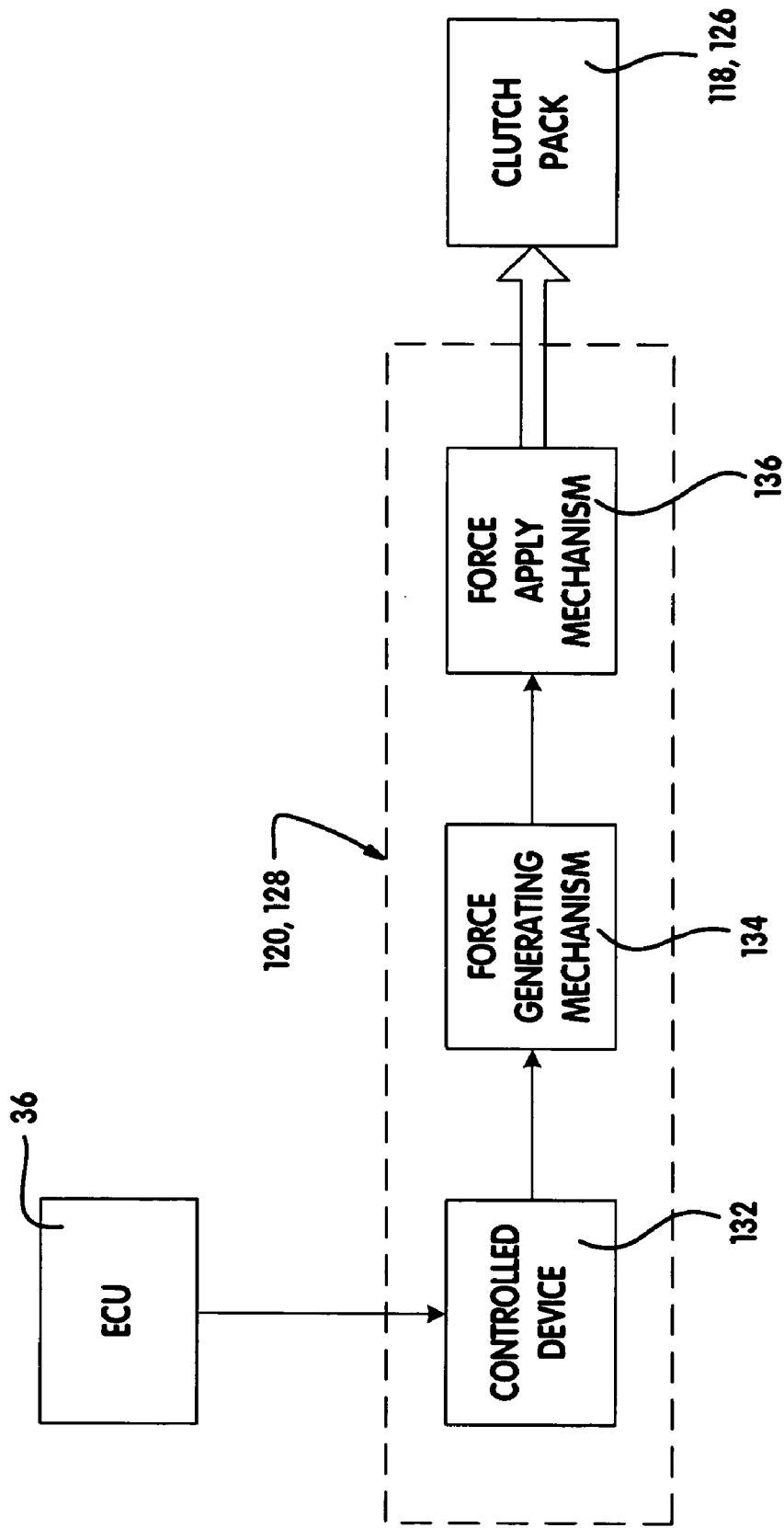
FIG. 4 is a diagrammatical illustration of the power-operated actuators associated with the torque distributing differential assembly of the present invention.

Power-operated clutch actuators 120 and 128 have been shown in schematic fashion to cumulatively represent the components required to accept a control signal from ECU 36 and generate a clutch engagement force to be applied to corresponding clutch packs 118 and 126. To this end, FIG. 4 diagrammatically illustrates the basic components associated with such power-operated clutch actuators. Specifically, each power-operated actuator includes a controlled device 132, a force generating mechanism 134, and a force apply mechanism 136. In electromechanical systems, controlled device 132 would represent such components as, for example, an electric motor or an electromagnetic solenoid assembly capable of receiving an electric control signal from ECU 36. The output of such an electric controlled device 132 would drive force generating mechanism 134 which could include, for example, a ballramp unit, a ballscrew unit, a leadscrew unit, a pivotal lever arm, rotatable cam plates, etc., each of which is capable of converting the output of controlled device 132 into a clutch engagement force. Finally, force apply mechanism 136 functions to transmit and exert the clutch engagement force generated by force generating mechanism 134 onto clutch packs 118 and 126 and can include, for example, an apply plate or a thrust plate. If a hydramechanical system is used, controlled device 132 could be an electrically-operated control valve that is operable for controlling the delivery of pressurized fluid from a fluid source to a piston chamber. A piston disposed for movement in the piston chamber would act as force generating mechanism 134. Preferably, controlled device 132 is capable of receiving variable electric control signals from ECU 36 for permitting variable regulation of the magnitude of the clutch engagement force generated and applied to the clutch packs so as to permit "adaptive" control of the mode clutches.

In accordance with the arrangement shown, torque distributing drive mechanism 28 is operable in coordination with yaw control system 34 to establish at a least four distinct operational modes for controlling the transfer of drive torque from input shaft 54 to axleshafts 30L and 30R. In particular, a first operational mode is established when first mode clutch 60 and second mode clutch 62 are both in their released mode such that differential 56 acts as an "open" differential so as to permit unrestricted speed differentiation with drive torque transmitted from drive case 68 to each of axleshafts 30L and 30R based on the tractive conditions at each corresponding rear wheel 32L and 32R. A second operational mode is established when both first mode clutch 60 and second mode clutch 62 are in their locked mode such that differential 56 acts as a "locked" differential with no speed differentiation permitted between axleshafts 30L and 30R. This mode can be intentionally selected via actuation of lock switch 50 when vehicle 10 is being operated off-road or on poor roads.

A third operational mode is established when first mode clutch 60 is in its locked mode while second mode clutch 62 is in its released mode. As a result, left axleshaft 30L is underdriven due to the coupled engagement of first speed gear 108 to transfer shaft 92. Thus, this third operational mode causes left axleshaft 30L to be underdriven relative to right axleshaft 30R when required to accommodate the current tractive or steering condition detected and/or anticipated by ECU 36 based on the particular control strategy used. Likewise, a fourth operational mode is established when first mode clutch 60 is shifted into its released mode and second mode clutch 62 is shifted into its locked mode. As a result, left axleshaft 30L is overdriven due to coupled engagement of second speed gear 112 to transfer shaft 92. Thus, this fourth operational mode causes left axleshaft 30L to be overdriven relative to right axleshaft 30R when required to accommodate the current tractive or steering conditions detected and/or anticipated by ECU 36.

At the start of vehicle 10, power from engine 12 is transmitted to front wheels 20L and 20R through transmission 14 and front differential 16. Drive torque is also transmitted to torque distributing drive mechanism 28 through PTU 22 and propshaft 24 which, in turn, rotatably drives input pinion shaft 58. Typically, mode clutches 60 and 62 would be non-engaged such that drive torque is transmitted through differential 56 to rear wheels 32L and 32R. However, upon detection of lost traction at front wheels 20L and 20R, one or both mode clutches 60 and 62 can be engaged to provide drive torque to rear wheels 32L and 32R based on the tractive needs of the vehicles.

In addition to on-off control of the mode clutches to establish the various drive modes associated with overdrive connections through speed changing unit 58, it is further contemplated and preferred that variable clutch engagement forces can be generated by power-operated actuators 120 and 128 to adaptively regulate the left-to-right speed and torque characteristics. This "adaptive" control feature functions to provide enhanced yaw and stability control for vehicle 10. For example, a reference yaw rate can be determined based on several factors including the steering angle detected by steering angle sensor 42, the vehicle speed as calculated based on signals from the various speed sensors, and a lateral acceleration as detected by lateral acceleration sensor 48. ECU 36 compares this reference yaw rate with an actual yaw rate value detected by yaw sensor 46. This comparison will determine whether vehicle 10 is in an understeer or an oversteer condition, and the severity of the condition, so as to permit yaw control system 34 to be adaptively control actuation of the mode clutches to accommodate these steering tendencies. ECU 36 can address such conditions by initially shifting drive mechanism 28 into one of the specific operational drive mode that is best suited to correct the actual or anticipated oversteer or understeer situation. Thereafter, variable control of the mode clutches permits adaptive regulation of the side-to-side torque transfer and speed differentiation characteristics when one of the distinct drive modes is not adequate to accommodate the current steer tractive condition.

Figure 5:
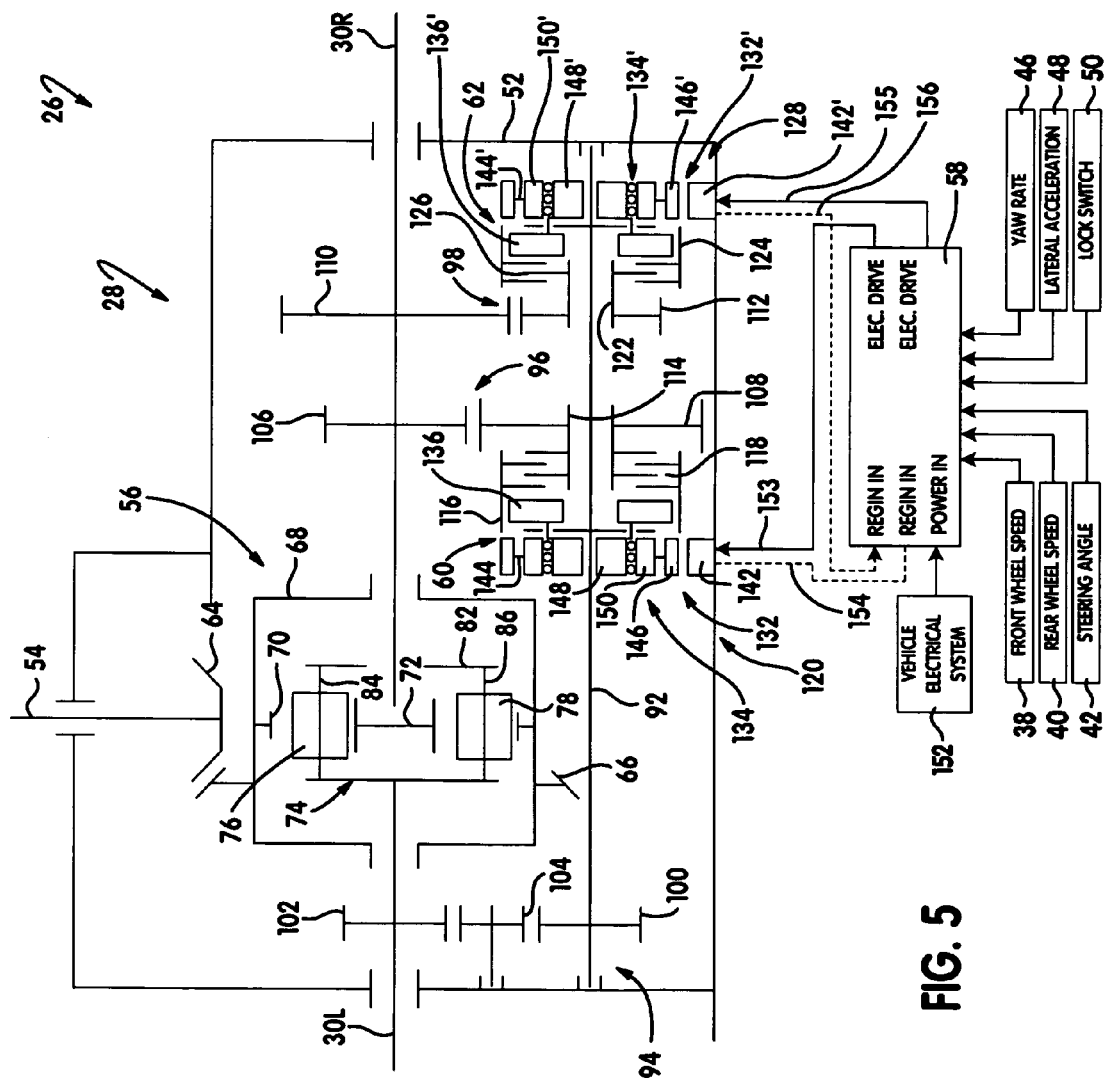
FIG. 5 through 7 are schematic illustrations of further alternative embodiments for the torque distributing differential assembly of the present invention.

Referring now to FIG. 5, drive mechanism 28 of FIG. 2 is now shown with a specific construction for its clutch actuators 120 and 128 in conjunction with a unique power-sharing electrical control system. In particular, clutch actuator 120 is shown to generally include an electric motor/brake unit as its controlled device 132, a ball screw operator as its force generating mechanism 134, and a pressure plate as its force apply mechanism 136. Motor/brake unit 132 is an annular assembly which includes a stator 142 and a rotor 144. Stator 142 is shown to be non-rotationally secured to housing 52. Rotor 144 includes a plate segment and an annular rim segment. As will be detailed, the plate segment of rotor 144 is fixed for rotation with a first component of ball screw operator 134. As seen, the rim segment of rotor 144 has a plurality of permanent magnets 146 secured thereto which are arranged in close proximity to the field windings of stator 142.

The annular configuration of motor/brake unit 132 permits simple assembly in concentric relation to transfer shaft 92 within housing 52. In addition, the packaging of motor/brake unit 132 inside housing 52 is advantageous in comparison to externally-mounted electric motor-type clutch actuators that are exposed to the hostile road and weather conditions associated with power transmission devices in motor vehicles. Due to commonality of the components associated with clutch actuators 120 and 128, the reference numbers used herein to identify the components of clutch actuator 120 are also used with a "primed" designation to identify similar components of second clutch actuator 128.

Ball screw operator 134 is shown in FIG. 5 to include an externally-threaded screw 148, an internally-threaded nut 150 and balls disposed in the aligned threads therebetween. Screw 148 is rotatably supported on transfer shaft 92. As seen, the plate segment of rotor 144 is fixed to nut 150. Ball screw operator 134 is operable to cause axial movement of screw 148 relative to nut 150 in response to relative rotation therebetween. In this manner, the torque outputted from motor/brake unit 132 is converted into an axially-directed thrust force. This axially-directed thrust force is subsequently transferred to pressure plate 136. Furthermore, it should be understood that ball screw operator 134 is merely one example of an applicable device for force generating mechanism and that other devices capable of converting rotary motion into a linear force (i.e., ballramp units, cam plates, etc.) should be considered equivalent to that disclosed.

In operation, motor/brake unit 132 will be controlled in either of a first ("motor") mode or a second ("brake") mode for controlling the torque applied to rotor 144 so as to control relative rotation between screw 148 and nut 150, thereby controlling the magnitude of the clutch engagement force applied by pressure plate 140 on clutch pack 118. Likewise, motor/brake unit 132' of clutch actuator 128 is controlled in either of a first ("motor") mode and a second ("brake") mode for controlling the torque applied to rotor 144' so as to control relative rotation between screw 148' and nut 150, thereby controlling the clutch engagement force applied by pressure plate 136' on clutch pack 126. Compared to conventional electrically-operated clutch actuator systems, the power-sharing control system of the present invention provides significant operational advantages. For instance, clutch actuators 120 and 128 require only minimal electric power from the vehicle's host electrical supply system 152 since, throughout most of its typical duty cycle, motor/brake units 132 and 132' each function in its brake mode and act as an absorber/generator for generating electrical power that can be dissipated or used to power the other clutch actuator or one or more auxiliary electric devices such as, for example, an electric lube pump.

When the rotary speed of transfer shaft 92 is below a predefined threshold value, motor/brake unit 132 operates in its motor mode such that stator coil 142 must be energized via an electrical control signal from controller 58 to drive rotor 144 in the appropriate rotary direction and through a desired amount of angular travel. Such controlled rotation of rotor 144 causes screw 148 of ball screw operator 134 to move axially relative to nut 150 in a corresponding direction and through a desired length of travel, thereby varying the magnitude of the clutch engagement force applied to clutch pack 118. Thus, the torque transfer mechanism of the present invention only uses motor/brake unit 132 in its motor mode to control torque transfer requirements during low speed situations. For example, motor/brake unit 132 operates in its motor mode to control the transfer of drive torque during a quick start or acceleration situation to avoid traction loss of rear wheels 32L and 32R.

Once the rotary speed of transfer shaft 92 exceeds the predefined threshold value, the control system switches functions such that motor/brake unit 132 operates in its brake mode as an electric brake (absorber/generator) for creating (regenerating) electric power. In particular, when the rotary speed of transfer shaft 92 is above the threshold value, rotation of rotor 144 (caused by rotation of the ball screw operator 134 as a unit) causes magnets 146 to generate a voltage in the field windings of stator coil 142. However, since stator coil 142 is not energized, no torque is applied to rotor 144. As such, ball screw operator 134 continues to rotate as a unit and screw 148 does not move axially in either direction. Upon energization of coil 142, a brake torque is generated which acts to slow rotation of rotor 144 and thus slow rotation of nut 150 relative to screw 148, thereby causing axial travel of screw 148 relative to clutch pack 118. With motor/brake unit 132 operating in the brake mode, the control system functions to maintain a predetermined torque on ball screw operator 134 which, in turn, acts to control engagement of clutch pack 118 so as to generate the desired amount of torque transfer to left axleshaft 30L. Preferably, motor/brake unit 132 is a dc permanent magnetic device which does not require a commutator or brushes.

As mentioned, motor/brake unit 132' is likewise controlled in either of a motor mode or a second brake mode for controlling the torque applied to rotor 144' so as to control relative rotation between screw 148' and nut 150', thereby controlling the magnitude of the clutch engagement force applied by pressure plate 136' on clutch pack 126. Specifically, when the rotary speed of transfer shaft 92 is below a predefined threshold value, motor/brake unit 132' operates in its motor mode such that stator coil 142' must be energized via an electrical control signal from controller 58 to drive rotor 144' in the appropriate rotary direction and through a desired amount of angular travel. Such controlled rotation of rotor 144' causes screw 148' of ball screw operator 134' to move axially relative to nut 150' in a corresponding direction and through a desired length of travel, thereby varying the magnitude of the clutch engagement force applied to clutch pack 126. Once the rotary speed of transfer shaft 92 exceeds the predefined threshold value, the control system switches functions such that motor/brake unit 132' operates in its brake mode as an electric brake (absorber/generator) for creating (regenerating) electric power.

When the rotary speed of transfer shaft 92 is above the threshold value, rotation of rotor 144' causes magnets 146' to generate a voltage in the field windings of stator coil 142'. However, since stator coil 142' is not energized, no torque is applied to rotor 144'. As such, ball screw operator 134' continues to rotate as a unit and screw 148' does not move axially in either direction. Upon energization of coil 142', a brake torque is generated which acts to slow rotation of rotor 144' and thus slow rotation of nut 150' relative to screw 148, thereby causing axial travel of screw 148' relative to clutch pack 126. With motor/brake unit 132' operating in the brake mode, the control system functions to maintain a predetermined torque on ball screw operator 134' which, in turn, acts to control engagement of clutch pack 126 so as to generate the desired amount of torque transfer to left axleshaft 30L. A power line 153 indicates the supply of electric power to motor/brake unit 132 while a generator line 154 indicates electric power regenerated by motor/brake unit 132. Likewise, power line 155 indicates the supply of electric power to motor/brake unit 132' while a generator line 156 indicates electric power regenerated by motor/brake unit 132'.

Figure 6:
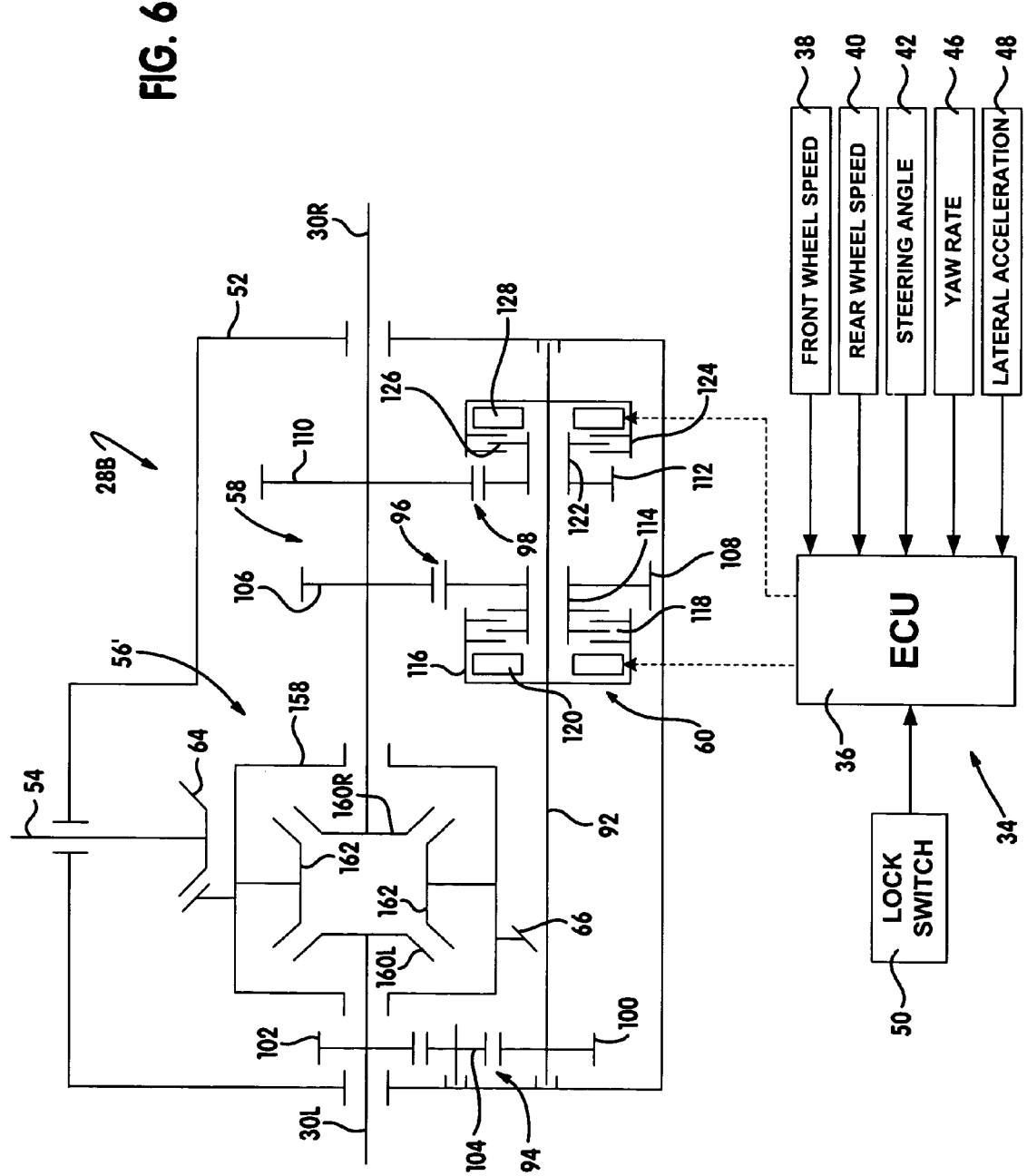

Referring now to FIG. 6, an alternative embodiment of torque distributing drive mechanism 28 of FIG. 2 is shown and designated by reference numeral 28. Generally speaking, a large number of components are common to both drive mechanism 28 and 28B, with such components being identified by the same reference numbers. However, a bevel differential 56B now replaces planetary differential 56. Bevel differential 56B includes a differential case 158 as its input component and a pair of left and right side gears 160L and 160R, respectively, as its output components. Pinion gears 162 are driven by differential case 158 and mesh with both of side gears 160L and 160R.

Figure 7:
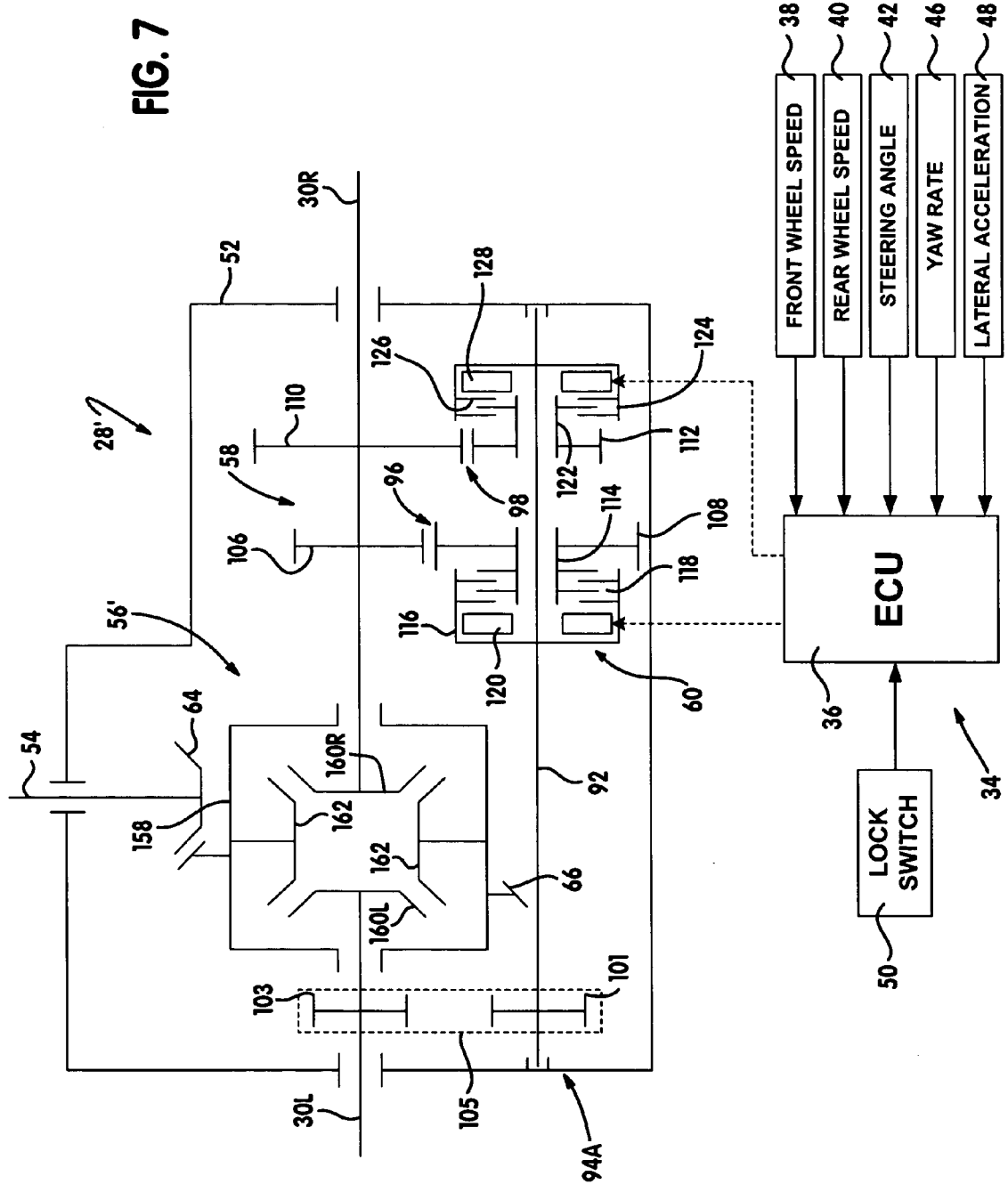

Drive mechanism 28B is also operable to establish the four operational drive modes previously disclosed. Specifically, with both first and second mode clutches 60 and 62 released, differential 56B acts as an open differential unit for transferring drive torque from differential case 158 to axleshafts 30L and 30R based on the tractive conditions at each wheel. Likewise, differential 58B is locked when both first and second mode clutches 60 and 62 locked. The third drive mode is again established when first mode clutch 60 is engaged and second mode clutch 62 is released such that the rotary speed of left axleshaft 30L is reduced relative to the rotary speed of right axleshaft 30R. Finally, the fourth operational drive mode is established when first mode clutch 60 is released and second mode clutch 62 is locked such that the rotary speed of left axleshaft 30L is increased relative to that of right axleshaft 30R. FIG. 7 illustrates drive mechanism 28B equipped with sprocket and chain transfer unit 94A instead of geared transfer unit 94.

Figure 8:
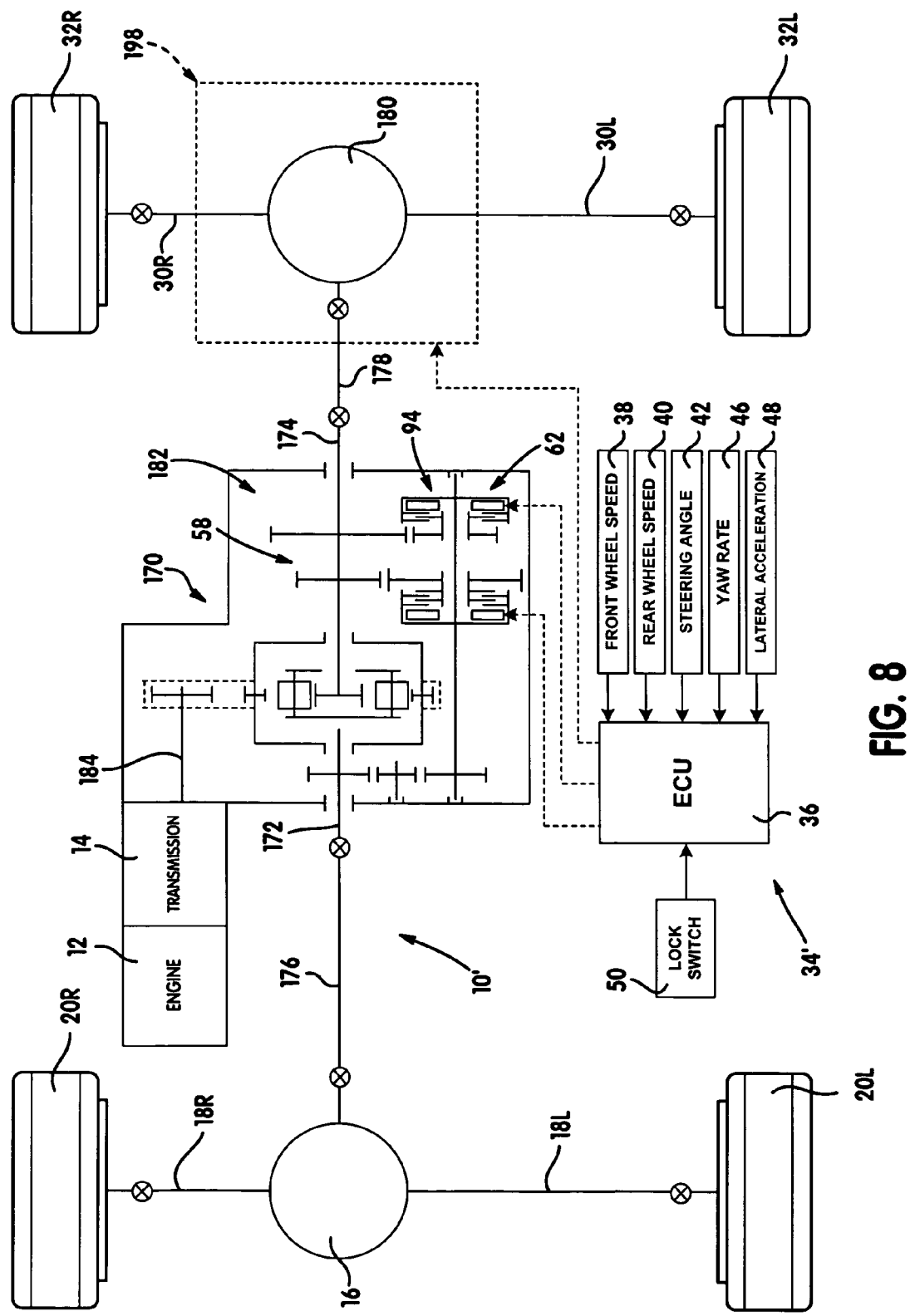
FIG. 8 is a diagrammatical illustration of a torque distributing differential assembly according to the present invention installed in a power transfer unit for use in a four-wheel drive vehicle.

Referring now to FIG. 8, a four-wheel drive vehicle 10' is shown equipped with a power transfer unit 170 that is operable for transferring drive torque from the output of transmission 14 to a first (i.e., front) output shaft 172 and a second (i.e., rear) output shaft 174. Front output shaft 172 drives a front propshaft 176 which, in turn, drives front differential 16 for driving front wheels 20L and 20R. Likewise, rear output shaft 174 drives a rear propshaft 178 which, in turn, drives a rear differential 180 for driving rear wheels 32L and 32R. Power transfer unit 170, otherwise known as a transfer case, includes a torque distributing drive mechanism 182 which functions to transmit drive torque from its input shaft 184 to both of output shafts 172 and 174 so as to bias the torque distribution ratio therebetween, thereby controlling the tractive operation of vehicle 10'. As seen, torque distribution mechanism 182 is operably associated with a traction control system 34' for providing this adaptive traction control feature for vehicle 10'.

Figure 9:
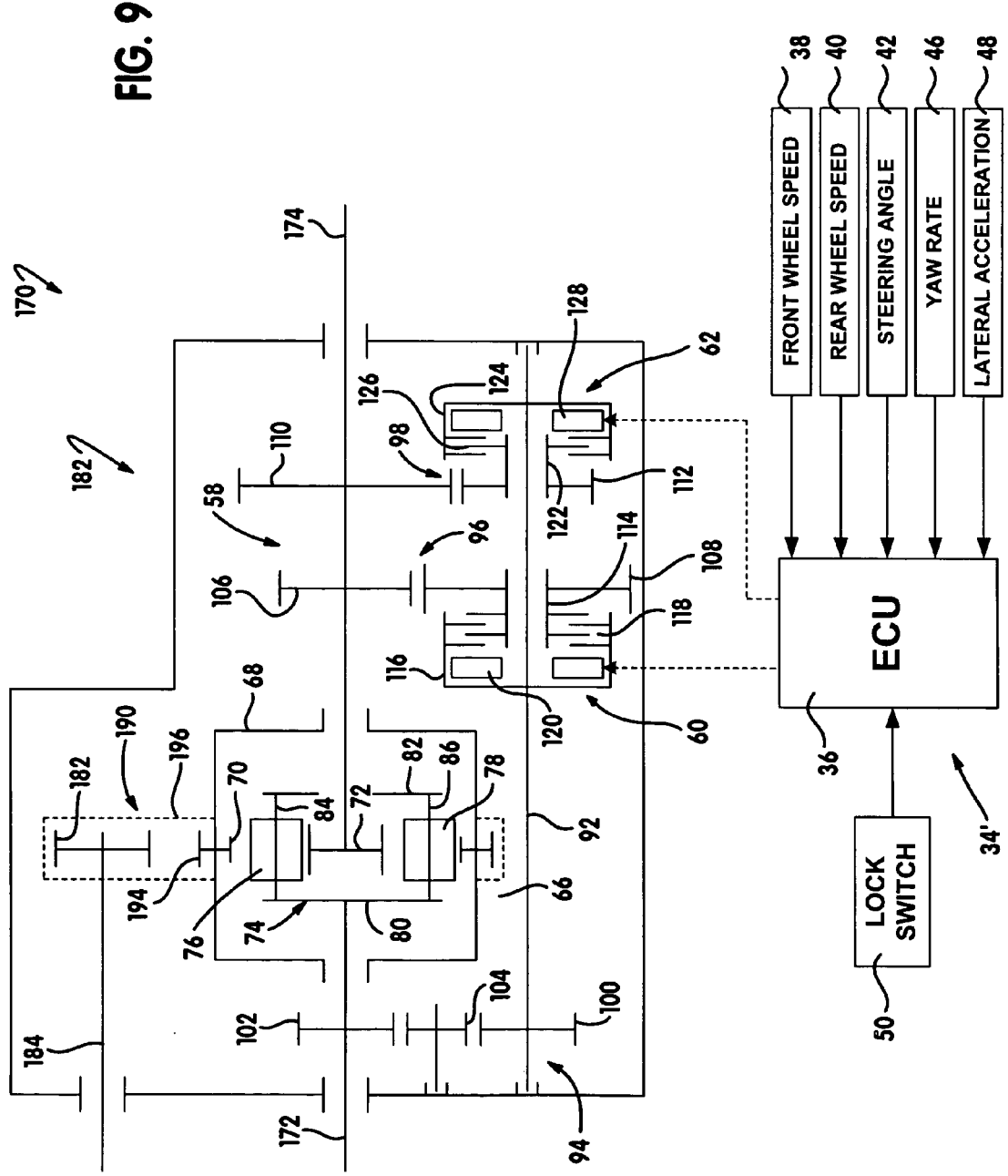
FIG. 9 is a schematic drawing of the power transfer unit shown in FIG. 8.

Referring primarily to FIG. 9, torque distribution mechanism 182 of power transfer unit 170 is shown to be generally similar in structure to drive mechanism 28 of FIG. 2 with the exception that drive case 68 is now drivingly connected to input shaft 184 via a transfer assembly 190. In the arrangement shown, transfer assembly 190 includes a first sprocket 192 driven by input shaft 184, a second sprocket 194 driving drive case 68, and a power chain 196 therebetween. As seen, front output shaft 172 is driven by differential carrier 74 of differential 56 which now acts as a center or "interaxle" differential for permitting speed differentiation between the front and rear output shafts while establishing a full-time four-wheel drive mode. In addition, sun gear 72 of differential 56 drives rear output shaft 164.

Control over actuation of mode clutches 60 and 62 results in corresponding increases or decreases in the rotary speed of rear output shaft 174 relative to front output shaft 172, thereby controlling the amount of drive torque transmitted therebetween. In particular, when both mode clutches are released, unrestricted speed differentiation is permitted between the front and rear output shafts while the gear ratio established by the components of interaxle differential 56 controls the front-to-rear torque ratio based on the current tractive conditions of the front and rear wheels. In contrast, with both mode clutches engaged, a locked four-wheel drive mode is established wherein no interaxle speed differentiation is permitted between the front and rear output shafts. Such a drive mode can be intentionally selected via lock switch 50 when vehicle 10' is driven off-road or during severe road conditions. An adaptive full-time four-wheel drive mode is made available under control of traction control system 34' to limit interaxle slip and vary the front-rear drive torque distribution ratio based on the tractive needs of the front and rear wheels as detected by the various sensors. In addition to power transfer unit 170, vehicle 10' could also be equipped with a rear axle assembly having a torque distributing drive mechanism 198 and its corresponding yaw control system, as is identified by the phantom lines in FIG. 8. It is contemplated that drive mechanism 198 can be representative of any of drive mechanisms 28, 28A, 28B and 28' disclosed herein.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A motor vehicle, comprising:
    a powertrain operable for generating drive torque;
    a primary driveline for transmitting drive torque from said powertrain to first and second primary wheels;
    a secondary driveline for selectively transmitting drive torque from said powertrain to first and second secondary wheels, said secondary driveline including an input shaft driven by said powertrain, a first axleshaft driving said first secondary wheel, a second axleshaft driving said second secondary wheel, a differential, a speed changing unit, and first and second mode clutches, said differential having an input component driven by said input shaft, a first output component driving said first axleshaft and a second output component driving said second axleshaft, said speed changing unit having a transfer shaft driven by said second axleshaft and first and second gearsets driven by said first axleshaft, said first mode clutch is operable for selectively coupling said first gearset to said transfer shaft and said second mode clutch is operable for selectively coupling said second gearset to said transfer shaft; and a control system for controlling actuation of said first and second mode clutches.

2. The motor vehicle of claim 1 wherein a first drive mode is established when said first mode clutch is engaged and said second mode clutch is released such that said second axleshaft is underdriven relative to said first axleshaft, and wherein a second drive mode is established when said first mode clutch is released and said second mode clutch is engaged such that said second axleshaft is overdriven relative to said first axleshaft.

3. The motor vehicle of claim 1 wherein a locked mode is established when both of said first and second mode clutches are engaged.

4. The motor vehicle of claim 1 wherein said differential includes a ring gear as its input component, a sun gear as its first output component, a carrier as its second output component, and planet gears supported by said carrier and which are meshed with said ring gear and said sun gear.

5. The motor vehicle of claim 1 wherein said differential includes a differential case as its input component, a first side gear as its first output component, a second side gear as its second output component, and pinion gears driven by said differential case that are meshed with both of said first and second side gears.

6. The motor vehicle of claim 1 wherein said first gearset includes a first drive gear driven by said first axleshaft that is meshed with a first speed gear rotatably supported on said transfer shaft, and wherein said second gearset includes a second drive gear driven by said first axleshaft that is meshed with a second speed gear rotatably supported on said transfer shaft.

7. The motor vehicle of claim 6 wherein said first mode clutch includes a first clutch pack disposed between said transfer shaft and said first speed gear and a first clutch actuator operable to generate and exert a clutch engagement force on said first clutch pack, wherein said second mode clutch includes a second clutch pack disposed between said transfer shaft and said second speed gear and a second clutch actuator operable to generate and exert a clutch engagement force on said second clutch pack, and wherein said control system is operable to control actuation of said first and second clutch actuators.

8. The motor vehicle of claim 1 wherein said first gearset is an underdrive unit that is driven at a slower rotary speed than said first axleshaft, and wherein said second gearset is an overdrive unit that is driven at a faster rotary speed than said first axleshaft.

9. A drive axle assembly for use in a motor vehicle having a powertrain and first and second wheels, comprising:
an input shaft driven by the powertrain;
a first axleshaft driving the first wheel;
a second axleshaft driving the second wheel;

a differential having an input component driven by said input shaft, a first output component driving said first axleshaft and a second output component driving said second axleshaft;

a speed changing unit having a transfer shaft driven by said second axleshaft and first and second gearsets driven by said first axleshaft;

a first mode clutch for selectively coupling said first gearset to said transfer shaft;

a second mode clutch for selectively coupling said second gearset to said transfer shaft; and a control system for controlling actuation of said first and second mode clutches.

10. The drive axle of claim 9 wherein said control system is operable to establish a first drive mode when said first mode clutch is engaged and said second mode clutch is released, whereby said first gearset causes said second axleshaft to be underdriven relative to said first axleshaft.

11. The drive axle assembly of claim 10 wherein said control system is operable to establish a second drive mode when said first mode clutch is released and said second mode clutch is engaged such that said second gearset causes said second axleshaft to be overdriven relative to said first axleshaft.

12. The drive axle assembly of claim 9 wherein said control system establishes a locked mode when both of said first and second mode clutches are engaged.

13. The drive axle assembly of claim 9 wherein said first gearset includes a first drive gear driven by said first axleshaft that is meshed with a first speed gear rotatably supported on said transfer shaft, and wherein said second gearset includes a second drive gear driven by said first axleshaft that is meshed with a second speed gear rotatably supported on said transfer shaft.

14. The drive axle assembly of claim 13 wherein said first mode clutch includes a first clutch pack disposed between said transfer shaft and said first speed gear and a first clutch actuator operable to generate and exert a clutch engagement force on said first clutch pack, wherein said second mode clutch includes a second clutch pack disposed between said transfer shaft and said second speed gear and a second clutch actuator operable to generate and exert a clutch engagement force on said second clutch pack, and wherein said control system is operable to control actuation of said first and second clutch actuators.

15. A drive axle assembly for use in a motor vehicle having a powertrain and first and second wheels, comprising:
an input shaft driven by the powertrain;
a first axleshaft driving the first wheel;
a second axleshaft driving the second wheel;
a differential having an input component driven by said input shaft, a first output component fixed for rotation with said first axleshaft, and a second output component fixed for rotation with said second axleshaft;
a transfer shaft;
a transfer unit coupling said transfer shaft for rotation with said second axleshaft;
a first gearset driven by said first axleshaft;
a second gearset driven by said first axleshaft;
a first mode clutch for selectively coupling said first gearset to said transfer shaft; and
a second mode clutch for selectively coupling said second gearset to said transfer shaft.

16. The drive axle assembly of claim 15 wherein said first gearset includes a first drive gear driven by said first axleshaft that is meshed with a first speed gear rotatably supported on said transfer shaft, and wherein said second gearset includes a second drive gear driven by said first axleshaft that is meshed with a second speed gear rotatably supported on said transfer shaft.

17. The drive axle assembly of claim 16 wherein said first mode clutch is disposed between said transfer shaft and said first speed gear and includes a first clutch actuator, wherein said second mode clutch is disposed between said transfer shaft and said second speed gear and includes a second clutch actuator, and wherein a control system controls actuation of said first and second clutch actuators for selectively controlling release and engagement of said first and second speed gears with said transfer shaft.

18. A transfer case for a four-wheel drive vehicle having a powertrain and first and second drivelines, comprising:
   an input shaft driven by the powertrain;
   a first output shaft driving the first driveline;
   a second output shaft driving the second driveline;
   a differential having an input component driven by said input shaft, a first output component driving said first output shaft and a second output component driving said second output shaft;
   a speed changing unit having a transfer shaft driven by said second output shaft, a first gearset driven by said first output shaft at a reduced speed relative to said transfer shaft, and a second gearset driven by said first output shaft at an increased speed relative to said transfer shaft,
   a first mode clutch for selectively coupling said first gearset to said transfer shaft;
   a second mode clutch for selectively coupling said second gearset to said transfer shaft; and
   a control system for controlling actuation of said first and second mode clutches.

19. The transfer case of claim 18 wherein said first mode clutch includes a first clutch pack disposed between said transfer shaft and said first gearset and a first clutch actuator operable to generate and exert a clutch engagement force on said first clutch pack, wherein said second mode clutch includes a second clutch pack disposed between said transfer shaft and said second gearset and a second clutch actuator operable to generate and exert a clutch engagement force on said second clutch pack, and wherein said control system is operable to control actuation of said first and second clutch actuators.

* * * * *